Jan. 4, 1938.    O. A. HAGE    2,104,516
COMBINATION LOCK
Filed Dec. 17, 1935    4 Sheets-Sheet 1

O. A. Hage
INVENTOR
By Glascock Downing & Seebold Attys.

Jan. 4, 1938. O. A. HAGE 2,104,516
COMBINATION LOCK
Filed Dec. 17, 1935 4 Sheets-Sheet 2
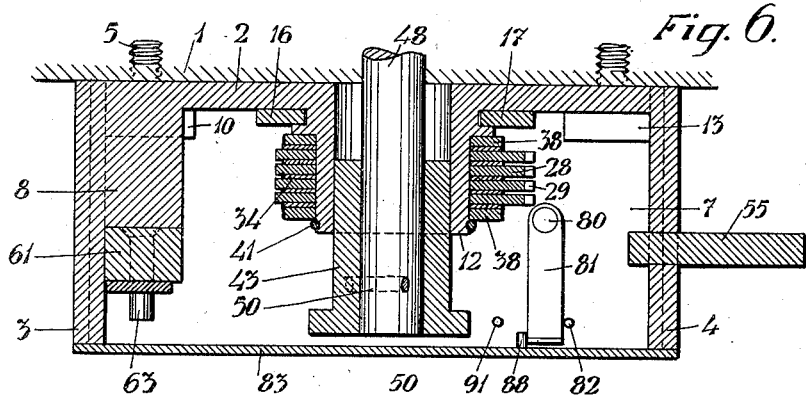
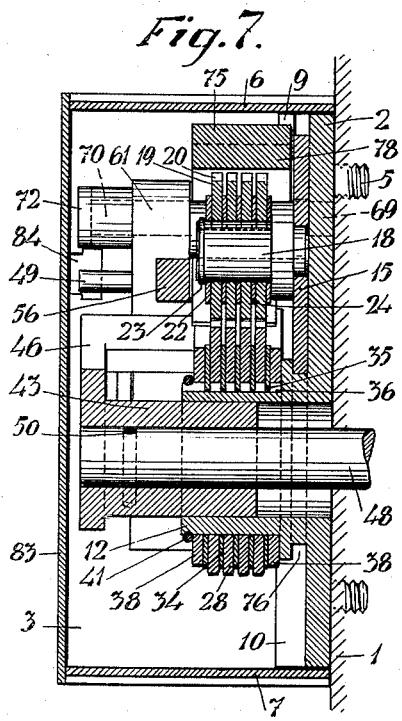
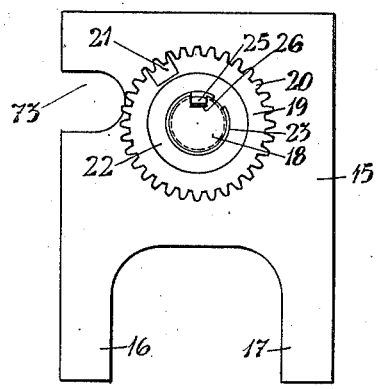
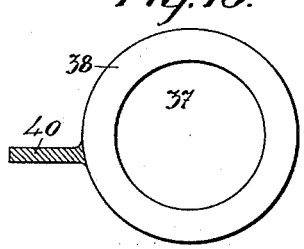
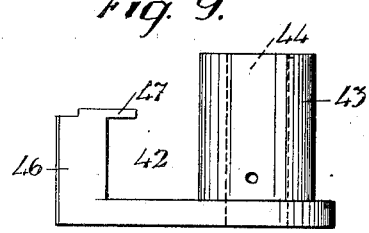
O. A. Hage
INVENTOR
By: Glascock Downing Seebold
Attys

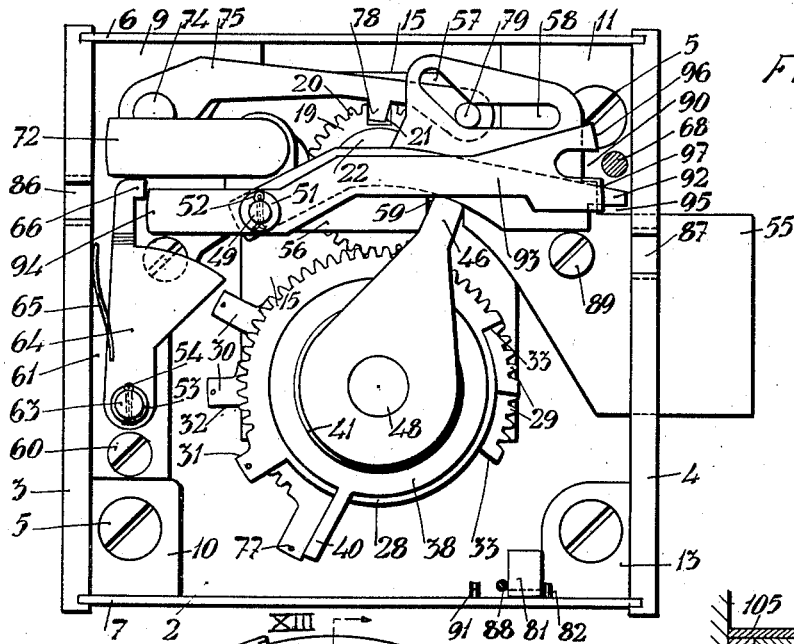
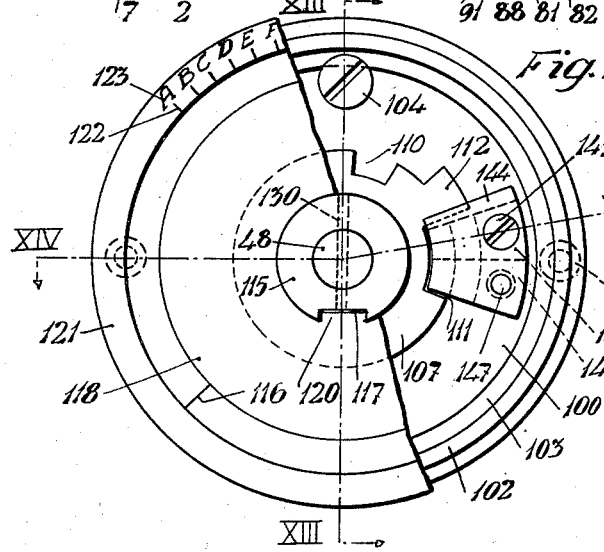
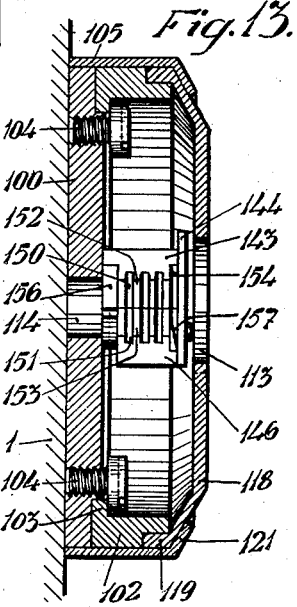
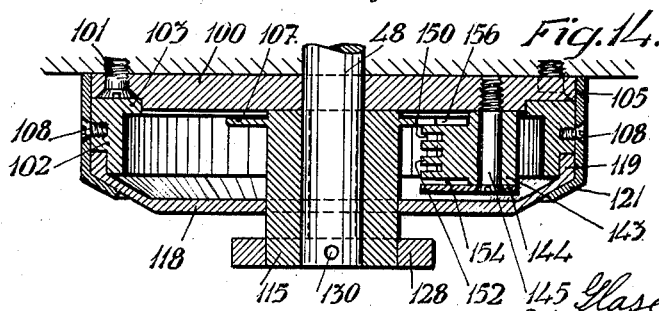

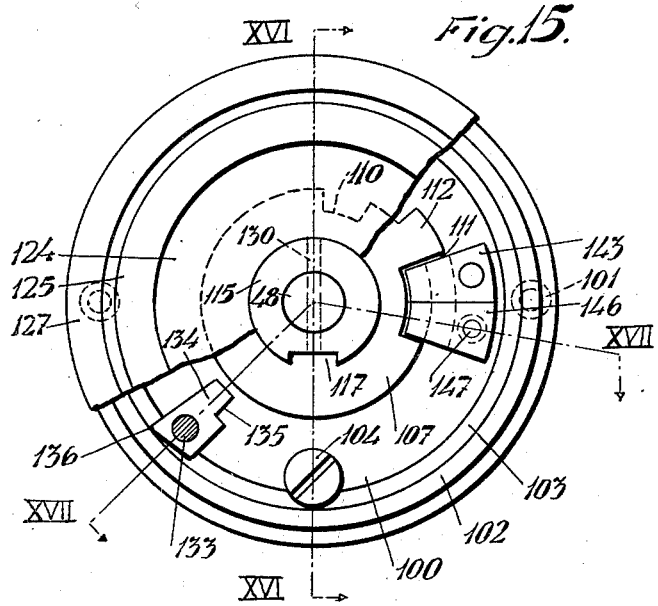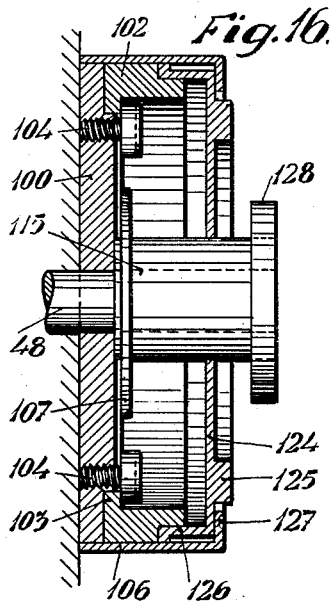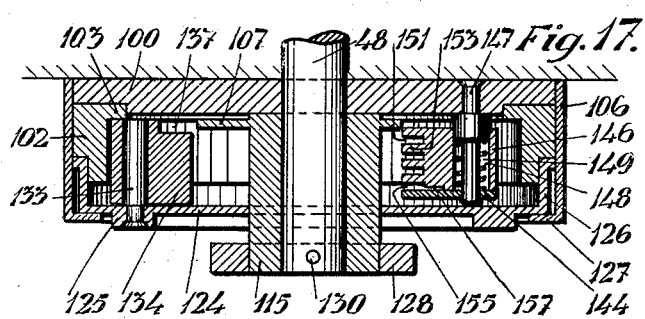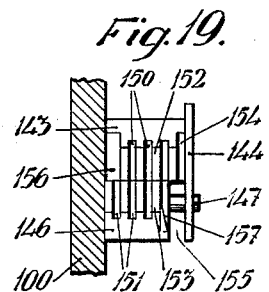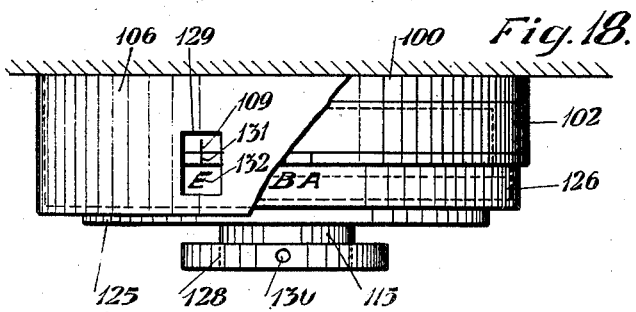

Patented Jan. 4, 1938

2,104,516

UNITED STATES PATENT OFFICE 2,104,516

COMBINATION LOCK

Olof Alfred Hage, Goteborg, Sweden

Application December 17, 1935, Serial No. 54,925
In Sweden June 9, 1935

6 Claims. (Cl. 70—305)

The present invention refers to combination locks for bank vaults, safes, and the like, in which a movable spindle extends through the door and adjustment into unlocking position is effected by turning movements of the spindle, which may alternate with axial displacements of the same. In such locks the spindle cooperates in a suitable manner with one or more scales and indices, by means of which the spindle may be adjusted corresponding to a combination of letters, figures or the like serving for unlocking the lock.

The object of the invention is to facilitate the adjustment of the lock into unlocked position. A further object of the invention is to prevent observation of the combination by others than the operator of the lock. A still further object of the invention is to provide a combination lock, in which resetting of the lock for a new combination is more simple than in the combination locks hitherto known, and in which special tools are not required and no parts comprised in the lock have to be disassembled, when the lock is being reset. Further objects of the invention are set forth in the following specification.

The invention is principally characterized by the provision in a lock of the type above referred to of an abutment adjustable corresponding to the turning movements of the spindle and adapted for limiting said movements.

In the accompanying drawings some embodiments of the invention are illustrated by way of example.

Figure 1:
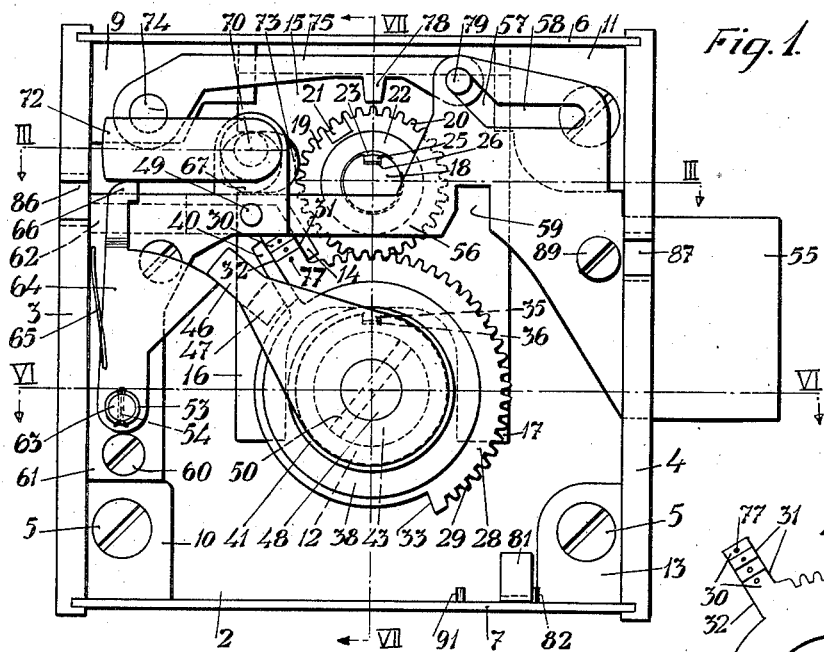
Figure 2:
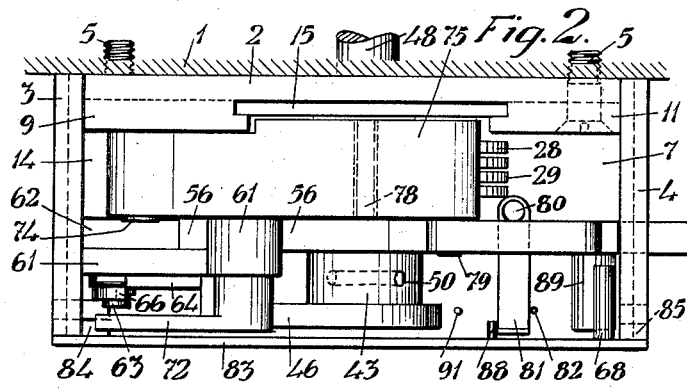
Figure 4:
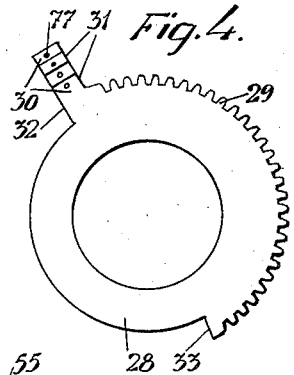
Figure 3:
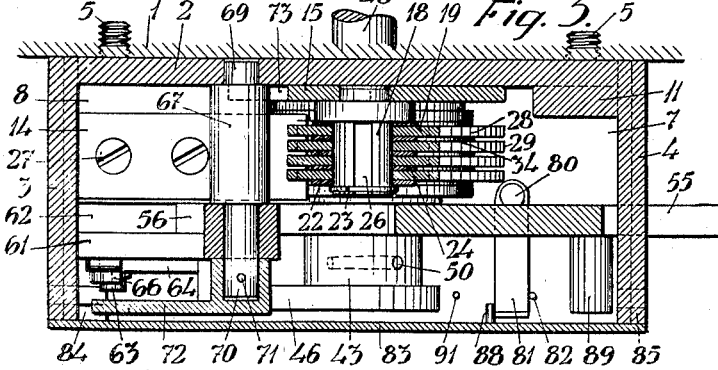
Figure 5:
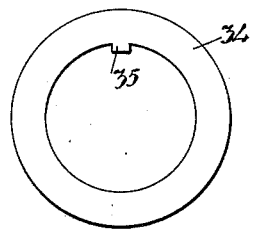

Figs. 1–11 show an inner lock device with appertaining parts adapted for provision at the inner side of a door. Fig. 1 is a view of the device viewed from the inner side of the door, the cover plate and some parts hiding the lock mechanism being removed. Fig. 2 shows the device viewed from above, an upper cover plate being removed. Fig. 3 is a section on line III—III in Fig. 1. Figs. 4 and 5 illustrate some details. Fig. 6 is a section on line VI—VI and Fig. 7 a section on line VII—VII in Fig. 1. Figs. 8, 9 and 10 illustrate further details pertaining to the device, and Fig. 11 is a view similar to Fig. 1 of the inner lock device viewed from the inside of the door, the parts of the lock being adjusted according to a certain combination and the cover plate alone being removed.

Figs. 12–14 illustrate an embodiment of a device provided at the outside of a door, the turning movements of the spindle being here determined by means of a marked disk and a corresponding scale. Fig. 12 shows the device viewed from the outside of the door, parts of the disk and a cover ring forming the housing of the device being removed, so as to make the inner parts of the device visible. Fig. 13 is a section on line XIII—XIII and Fig. 14 a section on line XIV—XIV in Fig. 12. In the section illustrated in Fig. 13 the spindle, a turning knob and an appertaining hub are removed for the sake of greater lucidity.

Figs. 15–18 show another embodiment of the outer lock device, in which an abutment adjustable according to the turning movements of the spindle is provided for limiting said movements. Fig. 15 shows the device viewed from the outside of the door, some parts hiding the inner parts of the device being removed in order to make said inner parts visible. Fig. 16 is a section on line XVI—XVI and Fig. 17 a section on line XVII—XVII in Fig. 15. Fig. 18 shows the device according to Fig. 15 viewed from above with parts of a cover ring removed. Fig. 19 is a detail of a guiding means for the spindle.

The lock device provided at the inside of the door and illustrated in Figs. 1–11 comprises a bottom plate 2 secured by means of screws 5 to the inside of the door 1, and side walls 3 and 4 provided with slots adapted to receive cover plates 6 and 7. The bottom plate 2 is formed with a hub 12 and provided with bosses 8, 9, 10, 11 and 13, the boss 8 of which is higher than the others, as illustrated in Fig. 6.

A plate 15, Fig. 8, provided with two guide legs 16 and 17 is displaceably mounted in slots provided in the bosses 9 and 11 and a slot 76 provided in the hub 12, Fig. 7.

The lock is provided with tumblers 19 formed as gear wheels provided with teeth 20 and rotatably mounted on a bolt 18 secured in the plate 15, each tumbler being provided with a notch 21 in the peripheral portion thereof.

In the embodiment shown, there are four tumblers, but a smaller or greater number of tumblers may be brought into use, if found suitable.

In order that the tumblers 19 shall not slide off the bolt 18, a ring 22 is placed on the latter, said ring being retained by a spring ring 23 clamped into a groove in the bolt 18. The tumblers are separated by intermediate washers 24, each provided with a projection 25 engaging a notch 26 provided in the bolt 18. By this means, the intermediate washers 24 are prevented from turning, and the turning of a tumbler by the turning of an adjacent tumbler is also prevented.

Rings 28 are rotatably mounted on the hub 12, said rings 28 having the appearance shown in Fig. 4. For a portion of their periphery said rings are provided with teeth 29 engaging the teeth 20 of the tumblers, when the latter teeth are in their normal position, as shown in Figs. 1 and 11. Each ring 28 is provided with a projection 30 forming an abutment 31, and a portion of the periphery of the ring between the projection 30 and the teeth 29 has a smaller radius, so that two further abutments 32 and 33 are formed. The rings 28 are separated by intermediate washers 34, Fig. 5, each of which is provided with a projection 35 engaging a notch 36 provided in the hub 12, so that the intermediate washers are guided against a turning movement and prevent that the turning of one ring 28 actuates any one of the adjacent rings. In Fig. 4 four rings 28 are illustrated placed one upon the other. The projections 30 of the different rings are of different lengths and in Fig. 4 the projection 30 of the rearmost ring has the greatest and the projection of the uppermost ring the smallest length each projection being provided with a recess 77.

In addition, the hub 12 is provided with a returning member 37 for the rings 28, see Figs. 6 and 10, which member is rotatably mounted, and the rings 28 and intermediate washers 24 are placed between the two annularly shaped end portions 38 thereof, which end portions are united by means of a cross piece 40, see Fig. 11. The returning member 37 is adapted on the return movement to catch the abutments 32 by means of the cross piece 40, and to return all rings 28 and the tumblers 19 to the zero position, i. e. the position they have to take, when the lock is locked.

Outside the returning member 37 there is a spring ring 41 clamped into a groove provided in the hub 12, so that the parts cannot slide off the hub.

An angular arm 42 of the appearance shown in Fig. 9 is provided on the spindle 48, said arm being rotatably and displaceably mounted by means of a central portion 43. Extending from the portion 43 is an angularly shaped arm 46 provided with a projection 47 directed radially inwardly. The portion 43 has a central bore forming a hole 44 and is inserted in the hub 12 and mounted on the spindle 48. The angular arm 42 is secured on the spindle 48 by means of a pin 50 or in any other suitable manner.

At the boss 8 an angularly bent plate 14 is secured by means of screws 27. The inner end of this plate forms an abutment for the projections 30, so that the rings 28, due to the engagement of the abutments 31 and the plate 14, cannot be turned past the position illustrated in Fig. 1.

The angular arm 42 is in the embodiment shown intended to take five axial positions, and in four of these the projection 47 is opposite one of the abutments 33, so that on turning the arm one of the rings 28 as well as a tumbler 19 will be turned. In the innermost axial position the projection 47 is free from the abutments 33 but lies in the path of the returning member 37, so that the latter is entrained in the return movement of the arm 42.

The bolt 55 of the lock is displaceably mounted in an aperture in the side wall 4 and extends in Fig. 1 toward the left into the lock casing, thus forming the bolt shank 56. Provided in the bolt 55 is an angular slot 57, 58 and a notch 59, which latter may be engaged by the arm 46 in a certain position for displacement of the bolt.

Secured on the boss 8 by means of screws 60 is a cap 61, which is provided with a slot 62 for the guidance of the bolt shank 56. A lever arm 75 swingably mounted on a stud 74 at the boss 9 is disposed over the tumblers 19 and provided with a pin 79 engaging the angular slot 57, 58, and with a cross member 78 extending over all of the tumblers 19.

If in the locked position of the lock the bolt is pressed inwardly, the pin 79 will press the cross member 78 against the teeth 20, so that an inward movement of the bolt is made impossible, but, if the notches 21 of all of the tumblers are beneath the cross member 78, the latter swings into the notches, thus permitting a free inward displacement of the bolt.

A pawl 64 adapted to contact arm 46 when spindle 48 is in its innermost position is swingably mounted on a stud 63 secured in the cap 61. Said pawl is provided with a spring 65 pressing the pawl against an extension 94 of a lever arm 93 extending to the left in Fig. 11. As viewed in the figure the pawl is extended upwards forming a boss 66. A washer 53 and a cotter pin 54 prevent the pawl 64 from sliding off the stud 63. When the arm 46 is turned against the pawl 64 (clockwise in Fig. 1), the pawl is moved sidewise, but again takes its normal position, when the arm is brought into the position shown in Fig. 1, whereby the spindle 48 is locked against turning movements in its innermost axial position.

An eccentric 67 is rotatably mounted in the bottom plate 2 and the cap 61 by means of journals 69, 70. The journal 70 extends through the cap, and secured to the free end thereof by means of a pin 71 is a lever 72. The eccentric 67 fits into a slot 73 provided in the plate 15. When the lever 72 is turned, the eccentric will impart a vertical movement to the plate 15, so that the teeth 20 of the tumblers 19 are brought out of engagement with the teeth 29 of the rings 28.

Swingably secured in the cover plate 7 by means of a rivet 80 is an angularly bent arm 81, the movements of which are limited by two pins 82 and 91 secured in the same cover plate. Two pins 68 and 88 are secured in the cover plate 83 of the inner lock device, and this cover plate is provided with two T-shaped bosses 84 and 85 fitting into slots 86 and 87 of the side walls 3 and 4, respectively, so that the cover plate in the normal position, illustrated in Figs. 2 and 3, cannot be removed without first having been displaced, so that the bosses 84 and 85 are disengaged from the slots 86 and 87, respectively.

The lever arms 92 and 93, Fig. 11, are swingably mounted on a stud 49 secured in the cap 61, and are prevented from sliding off said stud by a washer 51 and a cotter pin 52. The lever arm 92 has a notch 95, the vertical edge of which forms a stop for the bolt 55, when the lever arm 92 rests on the screw 89 with the horizontal edge of the notch, said position being the normal position, when the lock is locked. Now, if the bolt should by some reason be pressed towards the inner parts of the lock, said pressure is not transmitted by the bolt shank to the cross member 78 and does not press said cross member against the tumblers 19, but is, on the contrary, transmitted to the lever arm 92. Consequently, the tumblers 19 may independently of a pressure exerted on the bolt 55 and tending to push the bolt inwards easily be turned for unlocking of the lock. However, if the lever arm 92 is lifted by the arm 46, as illustrated in Fig. 11, the screw 89 is free to pass the notch 95.

The right end of the lever arm 93 is forked forming a notch 90 and two abutments 96 and 97, Fig. 11. When the lever arm 93 is lifted by the arm 46 to the position illustrated in Fig. 11, the cover plate may be displaced to the left, the pin 68 being able to move into the notch 90, but, when the lever arm 93 rests on the screw 89, which is the normal position of said lever arm, when the lock is locked, the pin 68 remains opposite the abutment 96. Thus the cover plate is prevented from moving to the left, and the pin 88 prevents the displacement of the cover plate to the right, which is also the case, when the arm 46 is in its uppermost position, i. e. when the lock is unlocked and the lever arm 93 is swung so far upwards that the abutment 97 forms a stop for the pin 68.

When the arm 46 is turned to the uppermost position the left hand portion of the lever arm 93 has swung so far downwards that the boss 66 of the pawl 64 catches the extension 94 and retains the lever arm 93 in stop position, even if the arm 46 is turned, and consequently the cover plate is still prevented from displacement.

The position of the arm 46 illustrated in Fig. 11, which may be determined from the outside through the observation of the position of a pin 130 extending through the spindle 48 and the turning knob 128, cannot be reached if all tumblers 19 are not correctly adjusted, the cover plate obviously cannot be removed by another person than the one, who knows the combination, for which the lock is set.

Figs. 12-14 illustrate an embodiment of the lock device provided at the outside of the door, in which the turning movements of the spindle for adjustment of the tumblers into unlocked position are indicated by a mark 116 on a disk 118 through the position of said mark relatively to marks 122 of a ring 121 indicated by letters 123. By means of the mark 116 and the mark 122 the different tumblers may easily be adjusted according to the combination for which the lock is set.

Figs. 15-18 show another embodiment of the lock device provided at the outside of the door, in which the turning movements of the spindle 48 are limited by an adjustable abutment such as a pawl 134, which before every turning movement of the spindle may be adjusted in such a manner that marks 131 provided on a ring 126 and indicated by letters 132 are adjusted one after the other oppositely to a mark 109 on a ring 102 according to the combination, for which the lock is set. This device has the advantage that the pawl 134 may easily be carefully adjusted, and that it does not matter, if at the adjustment the ring 126 should happen to be turned too far, since said ring may then be returned to the correct position. The spindle is not turned before the ring 126 has been carefully adjusted, and then the pawl 134 prevents turning of the spindle past the respective letter.

For the sake of simplicity the parts of the devices illustrated in Figs. 12-14 and 15-18 common for both devices will now be described. These parts are a bottom plate 100 secured to the outside of the door by means of screws 101, further a ring 102 provided with a mark 109, see Fig. 18, and a flange 103 serving to secure said ring to the bottom plate by means of screws 104. The ring 102 is rotatable so that it can be turned at the adjustment of the lock, before the screws are tightened, until the mark 109 stands opposite one of the marks 132, Fig. 18, when the notch 21 of the tumbler 19, which corresponds to said mark 132, stands immediately underneath the cross member 78. A careful and difficult adjustment of the position of the outer lock device relatively to the lock device at the inside of the door is thus eliminated. The screws 108 serve to secure the cover rings 105 and 106, respectively. A disk 107 is provided in both outer devices and has two notches 110 and 111 formed therein and a projection 112 extending therefrom, said disk being formed on a hub 115 having a central bore and mounted on the spindle 48, which is rotatable and displaceable in a bore 114 in the bottom plate 100. A turning knob 128 is provided on the outer end of the hub 115. This turning knob together with the hub 115 and the spindle 48 are bored through, a pin 130 being inserted in the bore, which pin fixes said parts relatively to one another. Consequently said parts and the disk 107 will move together with the turning knob 128.

Secured to the bottom plate 100 by means of a screw 145 in both outer lock devices are a plate 144 and a block 143, and provided beside the latter is a further block 146, the plate 144 covering both blocks. The block 146 is displaceably mounted on a pin 147 secured in the bottom plate 100 and is kept pressed against the plate 144 by means of a spring 148 disposed in the pin hole 149. The block 143 is of such a width that it may be received in the notch 110 of the disk 107, and both blocks together in the notch 111 of the same disk.

Provided in the two blocks are slots 150 and 151 directed radially towards the spindle 48, said slots being defined by teeth 152 and 153. The outermost teeth of the blocks 143 and 146 form, together with the plate 144, slots 154 and 155, respectively. The innermost tooth of the block 143 forms with the bottom plate 100 a slot 156. The block 146 is bevelled on the outer side, as shown in Figs. 13, 17 and 19, the bevelled portion 157 forming an extension of the slot 155.

The slots 150, 151, 154 and 155 are preferably of the same width as the thickness of the teeth 152 and 153, and the width of the slot 156 is equal to the width of a slot 151 plus the thickness of a tooth 153, which total measure corresponds to the thickness of a ring 28 plus an intermediate washer 34, Fig. 6, the block 146 being also in the same measure shorter than the block 143. Therefore, when the block 146 is displaced to abut against the bottom plate 100, which displacement is here referred to as "an axial step", this corresponds to a displacement from a ring 28 to the adjacent ring 28.

The slots 150, 151 and 155 are of such a depth that the periphery of the disk 107 may pass the same, while this is not the case with the projection 112, whereas the slots 154 and 156 are of such a depth that the projection 112 can also pass on a rotary movement of the disk 107. When the projection 112 is turned against the bevelled portion 157, it is permitted to pass, inasmuch as the block 146 is pushed away against the action of the spring 148, whereas on turning in the opposite direction it cannot pass the block.

Apart from the parts above described the lock device according to Figs. 12-14 consists of a disk 118 provided with a mark or index 116 and forming a ring 119, which is rotatably mounted on the ring 102. Furthermore, the disk 118 is provided with a central opening 113 and a projection 120 directed radially inwards and engaging a slot 117 in the hub 115. Obviously, the disk 118 follows the turning movements of the spindle 48, whereas a flange 121 of the cover ring 105 keeps said disk in a certain axial position. The flange 121 is provided with marks 122 indicated by letters 123.

Over the parts common to both outer lock devices, the outer lock device according to Figs. 15–18 comprises the following parts. A disk 124 is provided with an enlargement 125 and forms a ring 126 rotatably mounted on a ring 102. The hub 115 extends through a central hole in the disk 124 in such a manner that the hub may be rotated without entraining the disk 124 in the motion. A flange 127 on the cover ring 106 retains the disk 124 in its axial position. The ring 126 has marks 131 indicated by letters 132. Said marks and a mark 109 are visible in an aperture 129 in the cover ring 106, Fig. 18. This aperture is so large that the letters may be observed as they protrude upon the rotation of the disk 124, which rotation may, for instance, be caused by actuation of the enlargement 125 by means of the left hand thumb, which causes the rotation of the disk.

A pawl 134 is swingably mounted on the disk 124 at a bolt 133 secured thereto. Said pawl has such height that it is retained in its axial position by the disk 124 and the flange 103, and so formed that two stop edges 135 and 136 are produced thereon. Furthermore, the pawl has a recess 137 of such size that the projection 112 of the disk 107 may pass the pawl when the disk 107 is in its innermost axial position. When the projection 112 does not abut the edge 135 the disk 124 may be rotated, whereas the edge 136, when the projection 112 is turned against the edge 135, is pressed against the ring 102 and stops the rotation of the disk 107 and the spindle 48, respectively. The turning movements of the spindle in the four outer axial positions are thus defined by the positions taken by the pawl 134 in each case, and are indicated by the letters 132 in the aperture 129.

The operation of the devices is as follows:

When the lock is to be unlocked the turning knob 128 is pulled straight out, until the movement is impeded, when the guide disk 107 strikes against the plate 144. The projection 47 is then in front of the outer ring 28. The arm 46 has slidden past the pawl 64 so that the rotary movements of the spindle are no longer prevented.

The turning knob is now turned in a clockwise direction when viewed from the outside of the door, until the mark 116 is opposite the first letter of the combination serving for unlocking of the lock. The outer tumbler will then be turned in a corresponding degree by means of the projection 47. If the proper letter is used, the notch 21 of the tumbler 19 in question will be adjusted right underneath the cross member 78.

At the rotary movement the peripheral portion of the disk 107 enters the slot 154 and guides the spindle 48 against axial displacement. At the rotary movement the returning member 37 is also entrained by the ring 28.

Rotary movement then takes place in the opposite direction, until the projection 112 strikes against the block 146. The arm 46 does not reach as far as to the cross piece 49 of the returning member, so that disturbing of the position of an adjusted ring 28 is prevented. That part of the periphery of the disk 107, which is between the notch 110 and the projection 112, is at the same time situated in the slot 155 in the axially displaceable block 146. The turning knob 128 is now pressed inwardly and then entrains the block 146 by means of the disk 107, until said block abuts against the bottom plate, i. e., one axial step, see Fig. 19, the disk 107 then being brought in front of the first slot 158 in the block 143, while the projection 47 is brought in front of the next ring 28. Rotation is then effected in a clockwise direction and the last mentioned ring 28 is caught by the projection 47, the notch 21 of the corresponding tumbler 19 being adjusted underneath the cross member 78 when the movement is interrupted as the mark 116 stands opposite the second letter of the combination. When, at this rotation, the notch 110 is brought opposite the block 146 the latter is returned by the spring 148 to abut against the plate 144, the disk 107, however, remains in its axial position guided by the slot 159 of the block 143. After the adjustment of the tumbler the disk 107 is returned, as before, until the projection 112 strikes against the block 146, whereupon the turning knob together with the spindle is again pressed in by an axial step.

The turning movements and the axial displacements are then continued in the same manner, until after the fourth movement in the clockwise direction the notches 21 of all tumblers are underneath the cross member 78.

After the fourth axial step the disk 107 will be located in the slot 156, so that at the fifth turning movement in the clockwise direction the arm 46 abuts in the notch 59 of the bolt shank and presses the bolt 55 inwards. At this turning movement the arm 46 has lifted the lever arm 92 from the position, in which the screw 89 is blocked. The cross member 78 can now swing into the notch 21, and the inward displacement of the bolt is not prevented, but the bolt is moved into unlocking position, when the rotary movement is continued. During this movement the lever arm 93 has been lifted by the arm 46 into its uppermost position, thereby blockading the bolt 68 and simultaneously the extension 94 of the lever arm 93 has swung downwards, so that the boss 66 catches said extension and keeps the cover plate blockaded against displacement.

The movements of the spindle for unlocking a lock comprising the device according to Figs. 15–18 are the same as the spindle movements necessary for unlocking the lock comprising the device according to Figs. 12–14, in the device according to Figs. 15–18, however, marks 131 should be adjusted according to the respective combination opposite the mark 109 before each rotary movement of the spindle, so that the spindle movements are limited by the pawl 134 in the manner above described.

If the lock is again to be locked the spindle is turned in the opposite direction from the above mentioned unlocking position brought about by the last rotary movement in the clockwise direction. The arm 46 then displaces the bolt outwardly into locking position, the cross member 78 being then lifted out of the notches 21. The projection 47 catches the cross piece 49 of the returning member, which cross piece returns all of the rings 28, these latter then entraining the tumblers 19. At this movement the lever arm 92 has returned to the position, in which the lever arm rests on the screw 89 and blockades the same. The arm 46 moves the pawl 64 sidewise so that the boss 66 is swung out of engagement with the extension 94 of the lever arm 93, which regains the position, in which the displacement of the cover plate is prevented and the lever arm rests on the screw 89. The lock is now again locked, and all parts take their initial position.

Resetting of the lock for another combination is effected in the following manner:

At the resetting of the lock for a new combination the same operations are carried out as at unlocking, except that the fifth rotation in the clockwise direction is not completed and the movement of the spindle is interrupted in the position of the arm 46, in which the cover plate is displaceable in the manner above described. The cover plate is then displaced to the left in Fig. 1 and removed. The arm 81 is turned against the rear pin 91. The turning knob 128 is then turned, until the arm 46 abuts against the bent-up portion of the arm 81, which portion is now in the path of the arm 46. At this movement the cross member 78 is lifted out of the notches 21, but the tumblers 19 are not turned, the movement of the arm 46 having been stopped before it has reached the cross piece 40 of the returning member. The lever 72 is now turned half a revolution, the frame 15 carrying the tumblers being then raised so that the teeth 20 of the tumblers are brought out of engagement with the teeth 29 of the rings 28. The arm 81 is then returned into its former position and the turning knob 128 into locking position, the rings 28 being then also turned into locking position, without altering the angular position of the tumblers 19. The manner of operation is then as in unlocking, but the new combination is used. The rings 28 are then turned, their turning angles being determined by the new combination. After the adjustment the lever 72 is turned back, so that the tumblers again engage the rings. The turning knob 128 is then turned into locking position, each ring 28 turning a tumbler by a certain angle. In order that the lock may now be unlocked, it is necessary that each tumbler be turned back by exactly the same angle, and these angles are determined by the new combination, for which the lock is now set. Operations corresponding to those performed at the removal of the cover plate are then performed and the cover plate is again brought in place.

If incorrect operations are performed at the resetting of the lock, for instance a wrong letter may have been used, and it is then tried to bring the cover plate in place, this will be found to be impossible. The lock being set for another combination than that desired the tumbler representing the incorrectly set letter will be turned too far or too short, so that the notch 21 of said tumbler does not stand underneath the cross member 78. By this reason, the arm 46 cannot be turned into the position necessary for the removal of the cover plate, which position is the same as the position, in which the cover plate may be brought into place. Furthermore, the arm 72 cannot be turned backwards into normal position. In order now to bring the lock into order the rings 28 have to be turned so that the notches 21 of the tumblers 19 stand underneath the cross member 78, which may preferably be effected by means of the point of a knife or the like being introduced into the recesses 77, whereupon the rings 28 may be turned by means of the knife. Since the projection 30 of each rear ring 28 is longer than the projection 30 of each former ring, the position of the adjusted rings will not be disturbed, when an adjacent ring is adjusted. When all rings are adjusted so that all the notches are underneath the cross member 78, the lever 72 may be returned and the operation above described for resetting of the lock is repeated.

The details of the arrangement may obviously be subjected to a number of different modifications within the scope of the appended claims. The stepwise axial movement of the spindle may be effected outwardly instead of inwardly as above described for the embodiment shown in the drawings. The outer lock device may be built into a recess in the outside of the door, so that only the turning knob reaches outside the surface of the door, or may be provided in the intermediate space between the door surface and a plate covering the same, through which the turning knob projects.

What I claim is:—

1. In a combination lock, a movable spindle extending through the door, a member rotatable around the spindle and adjustable in different turning positions, a pawl movably mounted on said member and adapted to prevent rotation of said member, when in locking position, a scale on said rotatable member for determining the turning position of said member, and a member turning together with the spindle and adapted to abut against said pawl and thereby to bring the pawl into locking position.

2. In a combination lock, a movable spindle extending through the door, a member rotatable around the spindle and adjustable in different turning positions, a pawl movably mounted on said member and adapted to prevent rotation of said member, when in locking position, a scale on said rotatable member for determining the turning position of said member, a member turning together with the spindle and adapted to abut against said pawl and thereby to bring the pawl into locking position, and a cover enclosing said members and the pawl and provided with an aperture on its top for observation of the scale.

3. In a combination lock, a rotary and axially displaceable spindle extending through the door, tumblers adjusted into unlocked position by a stepwise axial displacement of said spindle in one and the same direction, alternating with turning movements in each axial position, an abutment rotatable around the spindle and adapted to be adjusted corresponding to turning movements of the spindle in limiting positions for the respective turning movements, a guide disk secured on the spindle, an abutment formed on said guide disk and adapted to engage said rotatable abutment when the spindle is turned, a plurality of teeth directed radially to the spindle and disposed beside one another in the axial direction, and adapted for cooperation with said guide disk, said teeth serving as guide members for the spindle during its axial displacement in a certain angular position, and also forming guide slots for the spindle at the turning thereof in each axial position.

4. In a combination lock, a rotary and axially displaceable spindle extending through the door, tumblers adjusted into unlocked position by a turning movement in each one of different axial positions of the spindle, members for guiding the spindle during its movements so arranged that unlocking of the lock is effected by turning of the spindle and returning of the same in each axial position, a member adapted to follow the turning movement of the spindle but being independent of axial displacements of the same, an index and a scale so arranged relatively to said index that upon adjustment of said member the index and the scale are adjusted relatively to one another thereby limiting the turning movements of the spindle.

5. In a combination lock, a movable spindle extending through the door, tumblers adjusted by turning movements of said spindle, a member turning together with the spindle, and an abutment rotatable around the spindle and adapted to be adjusted before each one of said turning movements into a limiting position for said turning movement of the spindle, in which position the abutment is engaged by and forms a stop for said member, when the spindle is turned for adjustment of a tumbler.

6. In a combination lock, a movable spindle extending through the door, tumblers adjusted by turning movements of said spindle, a member turning together with the spindle, a second member, an element rotatable around the spindle and adjustable in different turning positions, a pawl movably mounted on said second member and adapted to prevent rotation of said member, when in locking position, said pawl carrying second member being adapted to be adjusted before each one of said turning movements of the spindle into a limiting position for said turning movement of the spindle, in which position said pawl is brought into locking position upon engagement of said first mentioned member and forms a stop for said member, when the spindle is turned for adjustment of a tumbler.

OLOF ALFRED HAGE.